United States Patent [19]

Dillard

[11] Patent Number: 5,182,802

[45] Date of Patent: Jan. 26, 1993

[54] DATA ADDRESSABLE MEMORY ARCHITECTURE AND METHOD OF FORMING A DATA ADDRESSABLE MEMORY

[76] Inventor: Lawrence D. Dillard, P.O. Box 18238, Boulder, Colo. 80308

[21] Appl. No.: 864,463

[22] Filed: Apr. 6, 1992

[51] Int. Cl.⁵ .................... G06F 13/00; G06F 12/02
[52] U.S. Cl. .................................. 395/425; 395/400; 364/DIG. 1; 365/49; 365/230.05
[58] Field of Search ............... 365/49, 189.04, 230.05; 395/400, 425; 364/200 MS File, 900 MS File

[56] References Cited

U.S. PATENT DOCUMENTS

| | | | |
|---|---|---|---|
| 4,622,653 | 11/1986 | McElroy | 365/49 |
| 4,755,974 | 7/1988 | Yamada et al. | 365/49 |
| 5,122,984 | 6/1992 | Strehler | 365/49 |

*Primary Examiner*—Joseph L. Dixon
*Assistant Examiner*—Frank J. Asta
*Attorney, Agent, or Firm*—John R. Flanagan

[57] ABSTRACT

A data addressable memory (DAM) architecture includes a set of log, twist and linked list memories each having control, address and data ports. The log, twist and linked list memories also define respective arrays of log, twist, and linked list memory locations capale of being enabled and controlled via the control ports, identified via the address ports, and written into and read from via the data ports. The DAM architecture also includes a control arrangement which connnects control, address and data buses with the control, address and data ports of the log, twisted and linked list memories. The log, twist and linked list memory locations of the respective memories are controlled, identified, written and read via the respective control, address and data ports thereof such that all data values can be stored in respective memory locations of the RAM architecture without over-writing all duplicates thereof and all data values can be recovered from the respective memory locations of the DAM architecure without searching all memory locations.

20 Claims, 12 Drawing Sheets

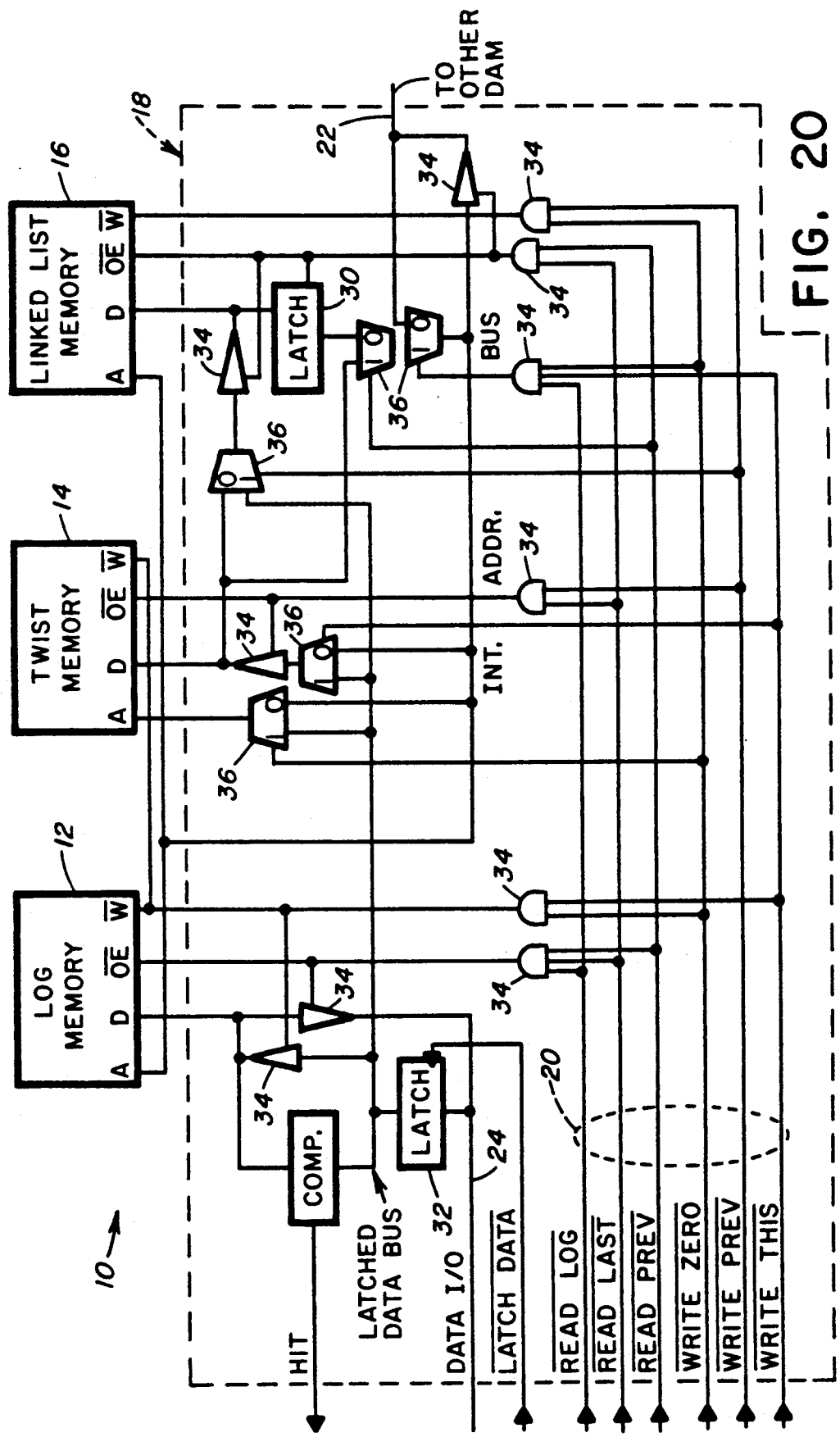

| | LOG | | | TWIST | | | | R-LINK | | | INTERNAL ADDRESS BUS SOURCE |
|---|---|---|---|---|---|---|---|---|---|---|---|
| | D | OE | W | A | D | OE | W | D | OE | W | |
| READ LOG | OUT | 0 | 1 | X | X | X | 1 | X | X | 1 | OUTSIDE |
| READ LAST | OUT | 0 | 1 | LATCHED DATA | OUT TO ADDRESS | 0 | 1 | OUT TO LATCH | 0 | 1 | TWIST DATA |
| READ PREV | OUT | 0 | 1 | X | X | X | 1 | OUT TO LATCH | 0 | 1 | LINK LATCH |
| WRITE ZERO | LATCHED DATA | 1 | 0 | ADDRESS | LATCHED DATA | 1 | 0 | LATCHED DATA | 1 | 0 | OUTSIDE |
| WRITE PREV | X | 1 | 1 | LATCHED DATA | OUT TO ADDRESS | 0 | 1 | TWIST DATA | 1 | 0 | TWIST DATA |
| WRITE THIS | LATCHED DATA | 1 | 0 | LATCHED DATA | IN FROM ADDRESS | 1 | 0 | X | 1 | 1 | OUTSIDE |

FIG. 21 ical memory architecture which is widely employed in computers is random access memory (RAM). RAM architecture functions to store data at different locations in memory which are identified by different addresses. Data can be written into RAM and read from RAM at the locations identified by the addresses. A word of stored data can only be read by using the address of its location in RAM. Thus, the address of the data's location must be known in order to access the data. Upon receipt of the address, RAM will output the data stored at that specific address, and only that data.

DATA ADDRESSABLE MEMORY ARCHITECTURE AND METHOD OF FORMING A DATA ADDRESSABLE MEMORY

BACKGROUND OF THE INVENTION

1. Field of the Invention

The present invention generally relates to computer memory technology and, more particularly, to a data addressable memory architecture and a method of forming a data addressable memory.

2. Description of the Prior Art

One conventional memory architecture which is widely employed in computers is random access memory (RAM). RAM architecture functions to store data at different locations in memory which are identified by different addresses. Data can be written into RAM and read from RAM at the locations identified by the addresses. A word of stored data can only be read by using the address of its location in RAM. Thus, the address of the data's location must be known in order to access the data. Upon receipt of the address, RAM will output the data stored at that specific address, and only that data.

In conventional RAM architecture, the data stored at different addresses have no logical connection (e.g. association or relation) with the specific address. In a growing number of different applications, for instance pattern recognition and machine vision to name just a few, conventional RAM architecture performs data searching and matching operations much too slowly to be useful. If one desires to match external data representing a pattern with data stored in RAM at unknown addresses, comparisons must be made by accessing each memory address of the RAM sequentially.

Another conventional memory architecture, referred to as content addressable memory (CAM), can perform these operations much faster. The CAM architecture, also called a fully-associative memory, searches for specific data located anywhere in memory by employing a portion of the data as the address. Unlike in RAM architecture where memory locations must be searched sequentially to find the matching stored data, in CAM architecture the entire memory is searched in parallel upon receipt of a data word. Matches are made without regard to memory location; data is addressable according to content. However, CAM architecture, compared to RAM architecture, involves higher complexity and thus higher costs which has limited its use, up to the present time, primarily to super-computers. Cost-effective computers have continued to employ lower-cost RAM architecture.

Consequently, a need still exists for a computer memory architecture which will overcome the problems and shortcomings associated with conventional RAM and CAM architectures.

SUMMARY OF THE INVENTION

The present invention provides a data addressable memory (DAM) architecture designed to satisfy the aforementioned need. The DAM architecture retains the relative advantage of the RAM architecture in terms of low-cost and of the CAM architecture in terms of high speed, but without their accompanying disadvantage, such being low speed for the RAM architecture and high complexity for the CAM architecture. By employing standard low-cost components in a unique arrangement, the DAM architecture greatly decreases the number of operations, compared to that required by conventional RAM architecture, to search memory and find matches with stored data and greatly increases the speed of operation to at or above levels achieved by the CAM architecture. The DAM architecture can be defined in either a software or hardware implementation.

Accordingly, the present invention is directed to a data addressable memory (DAM) architecture. The DAM architecture comprises a first or log memory, a second or twist memory and a third or linked list memory. The log memory defines a plurality of log memory locations capable of being sequentially identified by different address values and of storing data values at least some of which can be identical. The twist memory defines a plurality of twist memory locations capable of being sequentially identified by the data values and of storing the address values such that in the twist memory a subsequent one of the address values is permitted to over-write a previous one of the address values stored at the same one of the twist memory locations identified by identical ones of the data values. The linked list memory defines a plurality of linked list memory locations capable of being sequentially identified by the address values and of storing the over-written address values such that the address values over-written at the twist memory locations of the twist memory, which sequentially identify log memory locations of the log memory where identical ones of the data values are stored, are preserved at the linked list memory locations of the linked list memory.

The DAM architecture further comprises control means which couples the log, twist and linked list memories to separate control, address and data buses for enabling and controlling the identifying, writing and reading of the respective log, twist and linked list memory locations by the address and data values. Further, each of the log, twist and linked list memories is a memory device having control ports, address ports, data ports and an array of the memory locations. Each log, twist and linked list memory location is capable of being enabled via the control ports, identified via the address ports, and written into and read from via the data ports.

The present invention also is directed to a method of forming the DAM architecture. The first step of the forming method is defining a plurality of log memory locations capable of being sequentially identified by different address values and of storing data values at least some of which can be identical. The second step of the forming method is defining a plurality of twist memory locations capable of being identified sequentially by the data values and of storing the address values such that a subsequent one of the address values is permitted to over-write a previous one of the address values stored at the same one of the twist memory locations identified by identical ones of the data values. The third step of the forming method is defining a plurality of linked list memory locations capable of being sequentially identified by the address values and of storing the over-written address values such that the address values over-written at the twist memory locations, which identify log memory locations of the log memory where identical ones of the data values are stored, are preserved at the linked list memory locations.

Further, the fourth step of the forming method is defining control ports capable of enabling log, twist and linked list memory locations and of controlling writing and reading operations. The fifth step of the forming method is defining address ports capable of identifying the respective memory locations. The sixth step of the forming method is defining data ports capable of enabling the respective memory locations and of controlling the identifying, writing and reading of the respective memory locations by the address and data values.

These and other features and advantages of the present invention will become apparent to those skilled in the art upon a reading of the following detailed description when taken in conjunction with the drawings wherein there is shown and described illustrative embodiments of the invention.

BRIEF DESCRIPTION OF THE DRAWINGS

In the following detailed description, reference will be made to the attached drawings in which:

FIG. 20 is a detailed block diagram of the DAM architecture of the present invention, illustrating a hardware implementation of a single DAM unit for each member of a data set.

FIG. 21 is a detailed chart of various connections of the log, twist and linked list memories for each of the various operations performed using the DAM architecture.

DETAILED DESCRIPTION OF THE INVENTION

Overview of the DAM Architecture

Figure 1:
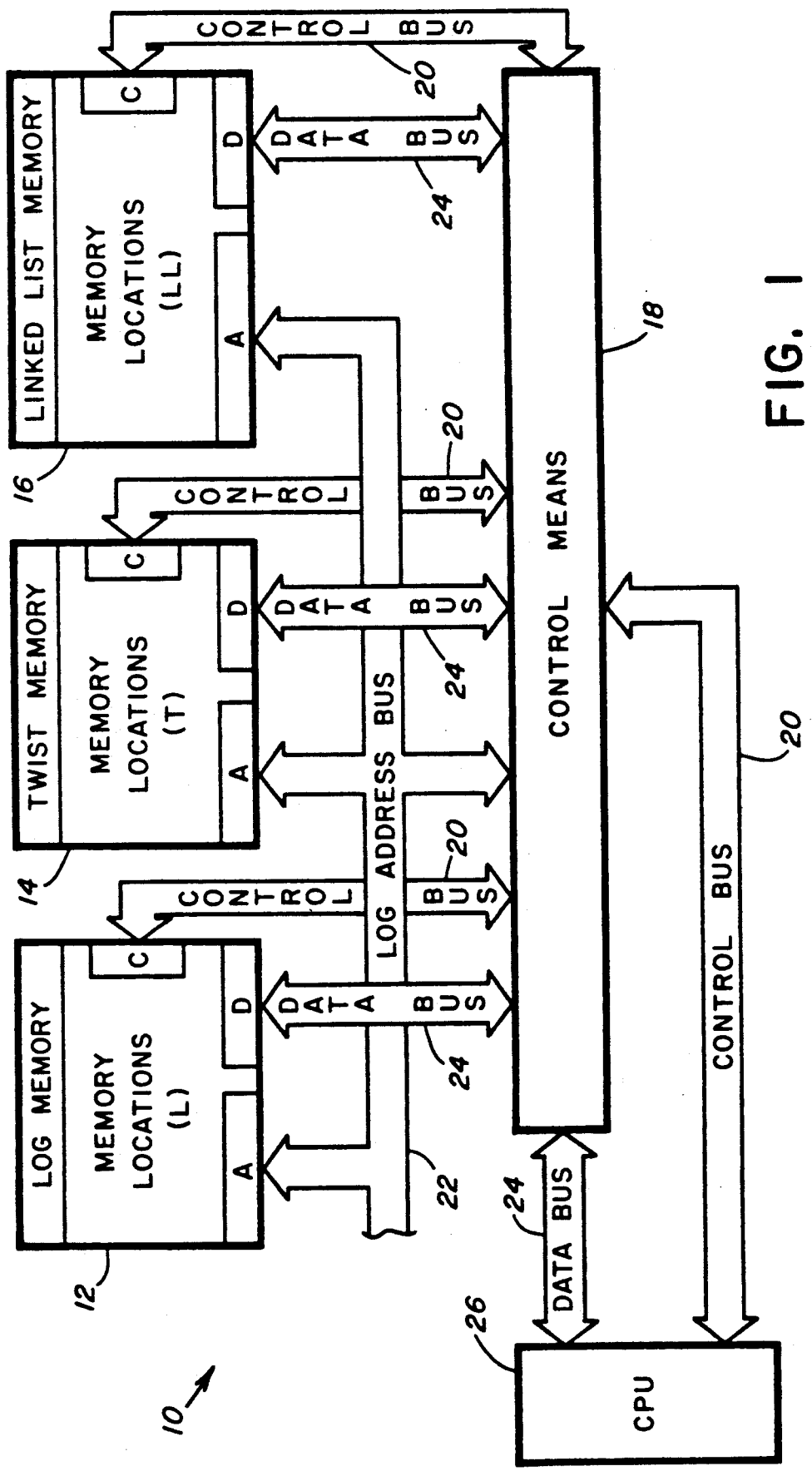
FIG. 1 is a block flow diagram of data addressable memory (DAM) architecture of the present invention being applicable for each member of a data set.

Referring to FIG. 1, there is illustrated a block flow diagram of a data addressable memory (DAM) architecture, generally designated 10, constructed in accordance with the present invention. Basically, the DAM architecture includes a first or "log" memory 12, a second or "twist" memory 14 and a third or "linked list" memory 16. Each of the log, twist and linked list memories 12, 14, 16 of the DAM architecture 10 has sets of control ports C, address ports A and data ports D.

More particularly, the log, twist and linked list memories 12, 14, 16 have respective arrays of log, twist and linked list memory locations L, T, LL. Each memory location is capable of being enabled and controlled via the control ports C, identified via the address ports A and written into and read from via the data ports D.

The DAM architecture 10 further includes control means 18 connecting the control, address and data ports C, A, D of each of the log, twist and linked list memories 12, 14, 16 in different configurations with separate bi-directional control, address and data buses 20, 22, 24. The control and data buses 20, 24, in turn, connect the control means 18 to a central microprocessing unit (CPU) 26. The address bus 22 is connected to an address generator 28 (FIG. 23) which is part of the control means 18. Control instructions, referred to as "enable", "write" and "read", are received by the control means 18 from the CPU 26 via the control bus 20 and transferred to the respective control ports C of the log, twist and linked list memories 12, 14, 16 and to the address generator 28 of the control means 18 to enable and control the identifying, writing and reading of their respective log, twist and linked list memory locations L, T, LL. Preferably, in addition to the address generator 28, the control means 18 includes an arrangement of a latch 30 (FIG. 20), latch 32 (FIGS. 20 and 23), digital logic gates 34 (FIG. 20), and multiplexers 36 (FIG. 20) which connect the log, twist and linked list memories 12, 14, 16 in parallel with one another and in the different configurations with the control and data buses 20, 24.

More particularly, the control means 18 is operable to selectively communicate the enable, write and read control instructions from the control bus 20 to the control ports C of the log memory 12, to selectively communicate address values via the address bus 22 to the address ports A of the log memory 12, and to selectively communicate data values between data bus 24 and the data ports D of the log memory 12. In order for the address values carried on the address bus 22 to be useful in identifying the different log memory locations L of the log memory 12, the address values are in a numerical sequence and thus are all different from one another. The data values can mainly be different from one another although it is assumed herein at least some of them can be identical to one another. Such selective communication provided by the control means 18 enables and controls the identifying of the log memory locations L by transferring the address values from the address bus 22 to the address ports A. Also, such selective communication provided by the control means 18 enables and controls the writing of the data values from the data bus 24 into the log memory locations L of the log memory 12 via the data ports D thereof or, alternatively, the reading of the data values from the log memory locations L of the log memory 12 via the data ports D thereof to the data bus 24, as such log memory locations L are being sequentially identified using the address values via the address ports A of the log memory 12.

Further, the control means 18 is operable to selectively communicate the enable, write and read control instructions from the control bus 20 to the control ports C of the twist memory 14, to selectively communicate the data values from the data bus 20 to the address ports A of the twist memory 12, and to selectively communicate the address values between address bus 22 and the data ports D of the twist memory 14. Such selective communication provided by the control means 18 enables and controls the identifying of the twist memory locations T by transferring the data values from the data bus 24 to the address ports A of the twist memory 14. Also, such selective communication provided by the control means 18 enables and controls the writing of the address values from the address bus 22 into the twist memory locations T via the data ports D thereof or, alternatively, the reading of the address values from the twist memory locations T via the data ports D thereof to the address bus 22, as such twist memory locations T are being sequentially identified using the data values via the address ports A of the twist memory 14. The writing of the address values from the address bus 22 to the twist memory locations T of the twisted memory 14 via the data ports A thereof will cause a subsequent address value to over-write a previous address value stored at the same one of the twist memory locations L identified by identical ones of the data values.

Further, the control means 18 is operable to selectively communicate the enable, write and read control instructions from the control bus 20 to the control ports C of the linked list memory 16, to selectively communicate the data ports D of the twist memory 14 to the data ports D of the linked list memory 16, and to selectively communicate the address ports of the linked list memory 16 to the address bus 20. Such selective communication provided by the control means 18 enables and controls the identifying of the linked list memory locations LL by transferring the address values from the data ports D of the twist memory 14 to the data ports A of the linked list memory 16. Also, such selective communication provided by the control means 18 enables and controls the writing of the over-written address values from the data ports D of the twist memory 14 to the linked list memory locations LL of the linked list memory 16 via the data ports D thereof or, alternatively, the reading of the over-written address values from the linked list memory locations LL of the linked list memory 16 via the data ports D thereof to the address bus 22, as such linked list memory locations LL are being sequentially identified using the address values via the address ports A of the linked list memory 16. The writing of the over-written address values from the data ports D of the twisted memory 14 to the linked list memory 16 via the data ports D thereof will preserve the over-written address values in the linked list memory 16. The sequential reading of the over-written address values from the linked list memory 16 via the data ports D thereof to the address bus 22 and subsequent sequential transfer of such over-written address values to the address ports A of the log memory 12 for identifying the log memory locations L of the log memory therewith permits sequential retrieving at the data ports D of the log memory 12 of all identical data values from the identified log memory locations L of the log memory 12.

In summary, identical data values are stored in the log memory 12 at different log memory locations L identified by different address values. However, in the twist memory 14, these different address values will be stored in the twist memory locations T identified by the identical data values. Since the identical data values identify the same location in the twist memory 14, the subsequently-received address values over-write the previously-received address values at the same location in the twist memory 14. The function of the linked list memory 16 is to recover these address values which are over-written in the twist memory 14. To do this, the linked list memory 16 must store the sequence of previous address values stored in the twist memory 14. Before subsequently-received address values are stored in the twist memory 14, and thus possibly over-writes the previously-received address values at the twist memory locations T identified by identical data values, the previously-received address values are stored in the linked list memory 16. The address values received by the linked list memory 16 from the address bus 22 are used to identify the locations LL in the linked list memory 16 where the previously-received over-written address values from the twist memory 14 gets stored.

Operation of the DAM Architecture

Referring to FIGS. 2 to 19, there is presented a sequence of diagrams which illustrate graphically and symbolically the makeup and operation of the DAM architecture 10 of the present invention. In the following discussion of the DAM architecture 10, it is assumed that the address values, for example 0 to 7, are generated in predetermined sequence, such as a numerical sequence, and are all different from one another. In other words, no address values are identical to each other. On the other hand, it is assumed that the data values are mainly different from one another although it is likely that at least some of the data values are identical to one another.

Figure 2:
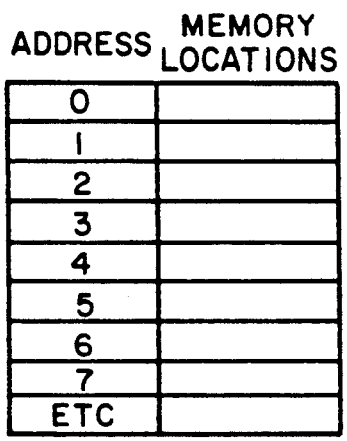
FIG. 2 is a diagram of a conventional memory device using a standard columnar symbology to illustrate a one-to-one relationship between address values and memory locations.

FIG. 2 uses a standard columnar symbology to diagrammatically depict a conventional write/read memory device, such as a random access memory (RAM) device, having a one-to-one relationship between the different address values and the memory locations identified by the address values where the data values can be stored. The left column of the diagram enumerates consecutive address values 0 to 7 which identify the memory locations being represented by the blank spaces in the right column of the diagram to filled or written in with the data values.

Figure 3:
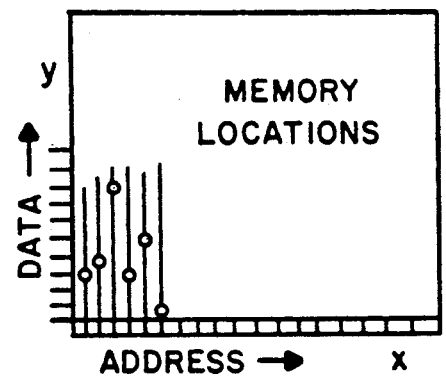
FIG. 3 is a diagram of the conventional memory device, using an X-Y coordinate symbology to illustrate the one-to-one relationship between the address values and memory locations.

FIG. 3 uses a horizontal/vertical, or X-Y, axes coordinate symbology to graphically depict the same conventional RAM memory device of FIG. 2. However, in the X-Y coordinate symbology, the different address values are represented by the equal gradations of the scale marked out along the X axis. The different memory locations are represented by a sequence of vertical lines which are identified by and horizontally-spaced apart by the same amount as the equal gradations of the X-axis scale representing the address values. The data values stored at the memory locations have respective magnitudes which correspond to the equal gradations of the scale marked out along the vertical Y axis.

Figure 4:
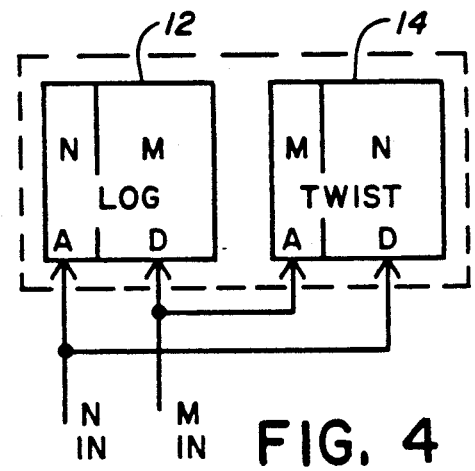
FIG. 4 is a diagram of two memory devices, using the standard symbology to illustrate a unique arrangement of the devices to define a normal or log memory and a twist memory of the DAM architecture.

FIG. 4 uses the standard columnar symbology to diagrammatically depict a pair of conventional RAM devices. However, in accordance with the principles of the present invention, the memory devices are in a connective arrangement that is different from that known heretofore which defines the first device (on the left in FIG. 4) as the "log" memory 12 and the second device (on the right in FIG. 4) as the "twist" memory 14 of the DAM architecture 10. The term "twist" connotes the reversal in the orientation of the electrical path connections to the address and data ports A, D of the second or "twist" memory 14 compared to the electrical path connections to the address and data ports A, D of the first or "log" memory 12.

Figure 5:
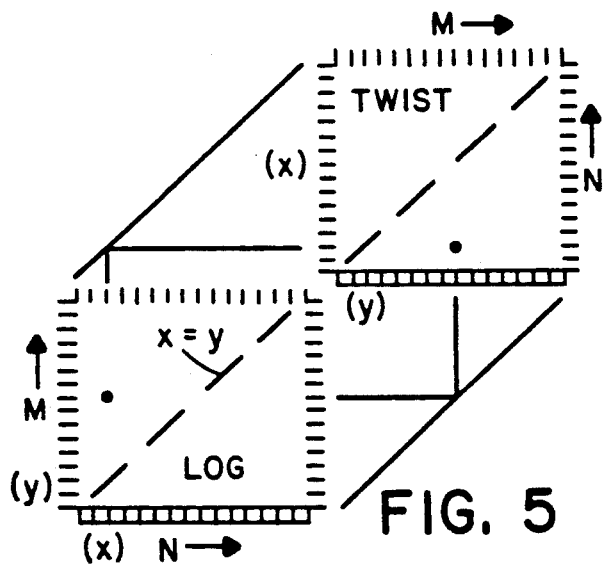
FIG. 5 is a diagram of the two memory devices, using the X-Y coordinate symbology to illustrate the log and twist memories of the DAM architecture and a single entry in each memory.

FIG. 5 uses the X-Y coordinate symbology to graphically depict the log and twist memories 12, 14 of FIG. 4. The reversal in the orientation of the respective electrical path connections shown in FIG. 4 is represented in FIG. 5 by reversal in the respective positions of the X-axis and Y-axis scales. Due to the reversal of the orientations of the electrical path connections, the address values received by the address ports A of the log memory 12 are received by the data ports D of the twist memory 14, while the data values received by the data ports D of the log memory 12 are received by the address ports A of the twist memory 14 to identify the memory locations where the data values are stored. The X-Y coordinate representation of the log and twist memory arrangement illustrates a relation of mirror symmetry between the two memories about a dashed line that defines X=Y. The twist memory has a configuration which makes it a data addressable memory. But, it cannot read out address values that have been lost by being over-written.

Figure 6:
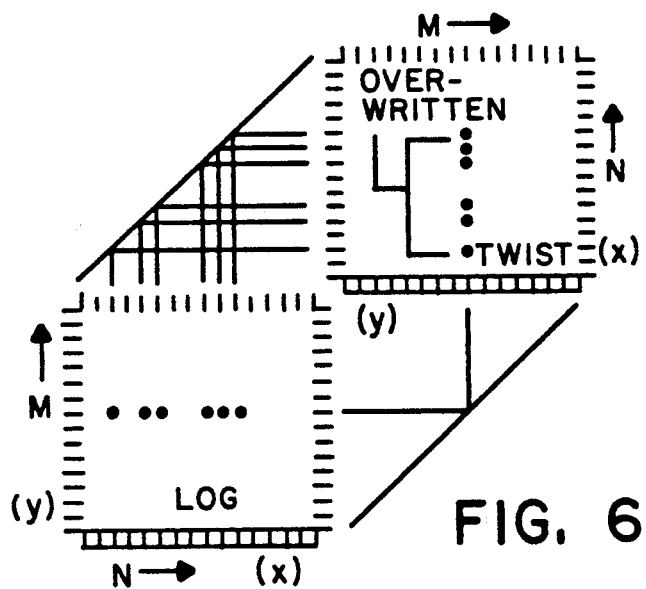
FIG. 6 is a diagram of the log and twist memories, being identical to that of FIG. 5 but illustrating multiple entries in the log memory and over-written entries in the twist memory.

FIG. 6 depicts the log and twist memories 12, 14 in a graphical manner identical to that of FIG. 5 using the X-Y coordinate symbology. Whereas FIG. 5 depicted the storing of a single data value in a single memory location identified by a single address value in each of the memories 12, 14, FIG. 6 depicts storing of identical data values at multiple memory locations identified by multiple address values in the log memory 12 but only storing of the last address value (represented by the large circular dot) of the multiple address values in a single memory location identified by the identical data values in the twist memory 14. The earlier address values (represented by the row of small circular dots) stored at the one memory location are over-written. The DAM architecture provides a third or "linked list" memory where the over-written address values are stored and saved and can be recovered.

Figure 7:
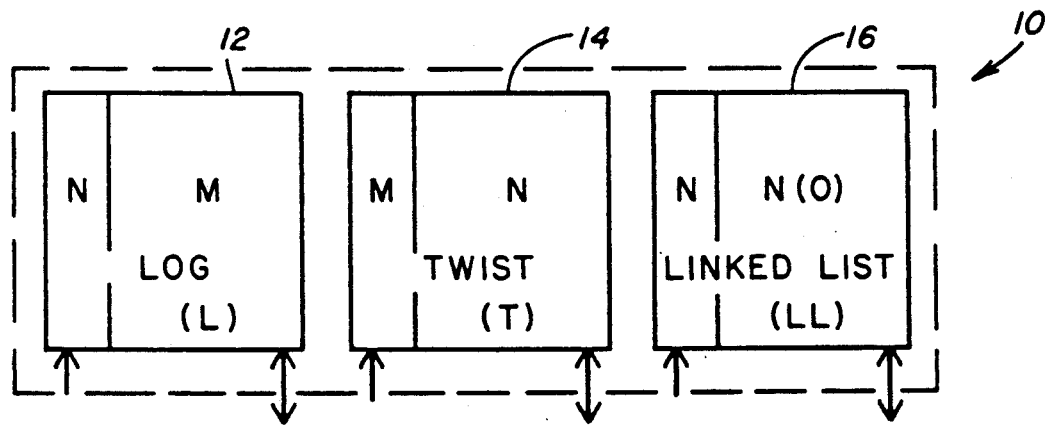
FIG. 7 is a diagram of three memory devices, using the standard symbology to illustrate a unique arrangement of the devices to define log, twist and linked list memories of the DAM architecture for each member of a data set.

FIG. 7 depicts, in standard symbology, the log, twist and linked list RAM memories 12, 14, 16 of the DAM architecture 10 of the present invention for each member of a data set. The memory locations in the log and linked list memories 12, 16 are addressed or identified sequentially by advancing the address generator 28 (FIG. 23) one step per each writing or reading cycle. Writing of values into memory locations is sequential, but reading of values from memory locations is random access. Due to the unique connective arrangement of the log, twist and linked list memories 12, 14, 16 with one another, the address values of duplicates of data values which will be over-written in the twist memory 14 are saved in the linked list memory 16 before being over-written in the twist memory 14.

Figure 8:
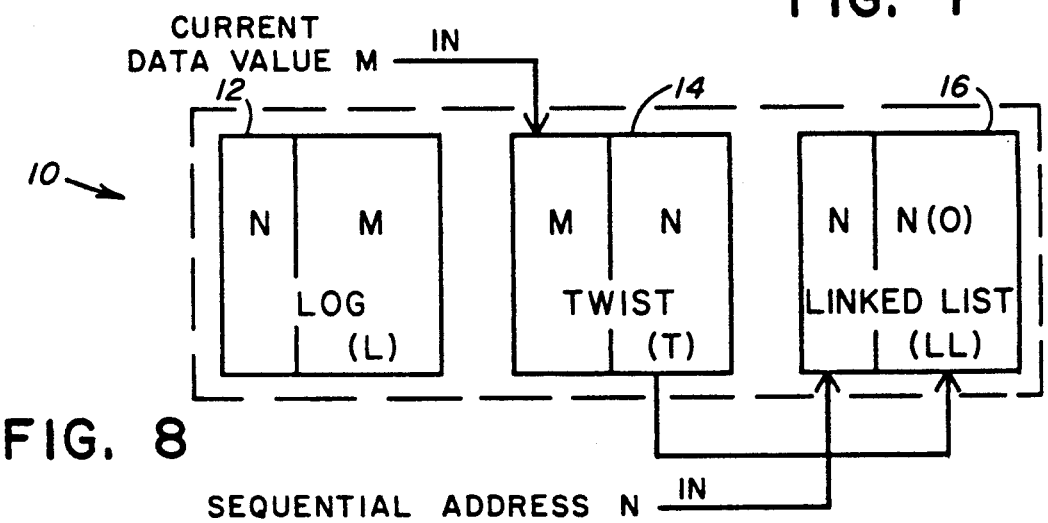
FIG. 8 is a diagram of the DAM architecture, using the standard symbology to illustrate a first step of a two-step memory write operation.
Figure 9:
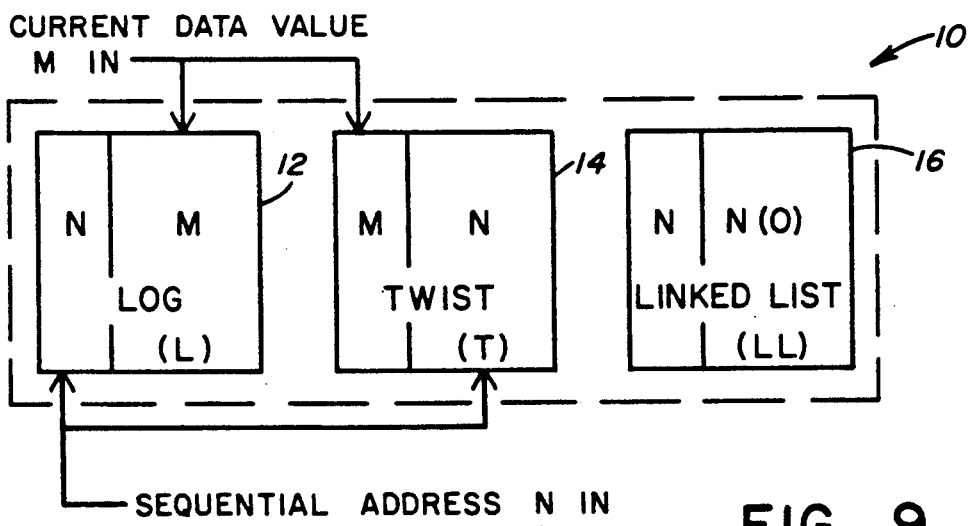
FIG. 9 is a diagram of the DAM architecture, using the standard symbology to illustrate a second step of the two-step memory write operation.
Figure 10:
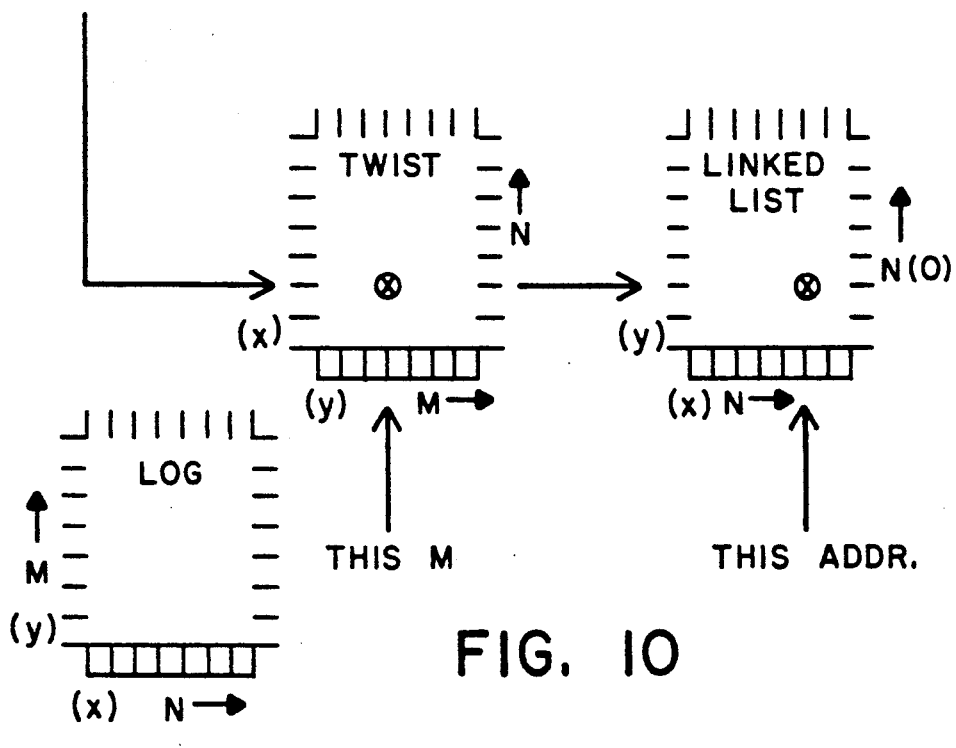
FIG. 10 is a diagram of the DAM architecture, using the X-Y coordinate symbology to illustrate the first step of the two-step memory write operation.
Figure 11:
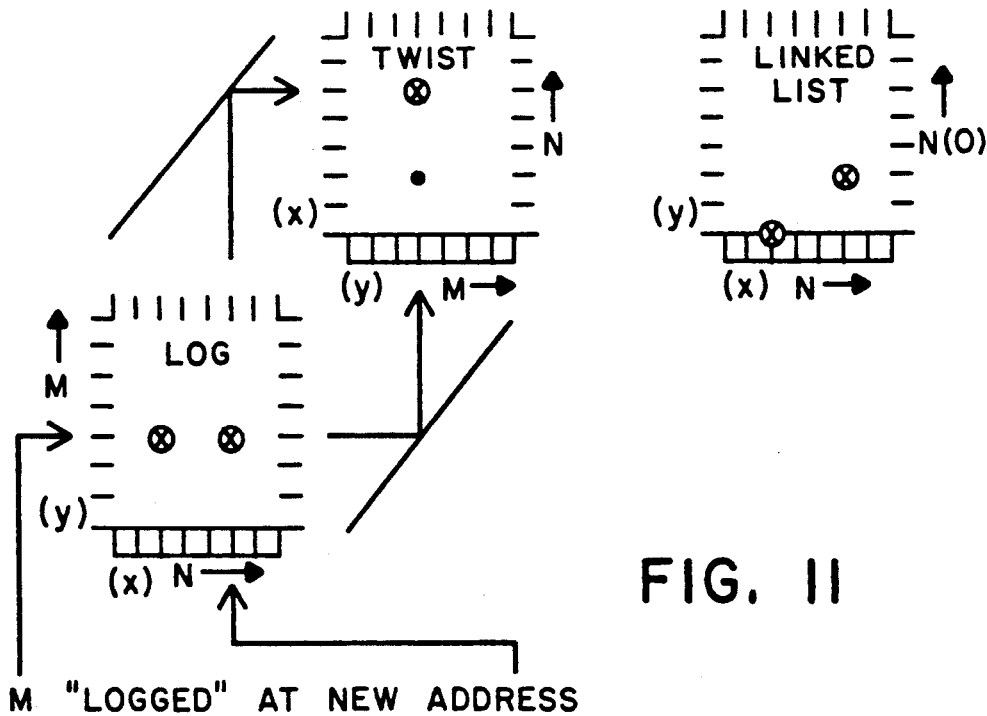
FIG. 11 is a diagram of the DAM architecture, using the X-Y coordinate symbology to illustrate the second step of the two-step memory write operation.

FIGS. 8 and 9 diagrammatically illustrate, in standard symbology, the first and second steps of a two-step memory write operation employing the DAM architecture 10 of the present invention. FIGS. 10 and 11 graphically illustrate, in X-Y coordinate symbology, the first and second steps of the same two-step memory write operation as illustrated in FIGS. 8 and 9. It will be assumed that two identical data values are being written into the DAM architecture 10 in order to demonstrate the critical role played by the linked list memory 16 of the DAM architecture 10.

The first memory write step employing the DAM architecture 10, being shown in FIGS. 8 and 10, uses the current data value M which is to be written into a memory location L of the log memory 12 identified by the current sequential address value N (as shown in FIGS. 9 and 11) to first transfer from the twist memory 14 to the linked list memory 16 any previous address value N in a memory location T of the twist memory 14 identified by an earlier duplicate of the current data value M in order to save such previous address value, denoted as N(O), in a memory location LL of the linked list memory 16 identified by the current sequential address value N. This step must occur first because in the next or second step of the memory write operation, the previous address value N(O) will be over-written in the twist memory 14.

The second (and final) memory write step employing the DAM architecture 10, being shown in FIGS. 9 and 11, stores the current data value M at a memory location L in the log memory 12 identified by the current sequential address N and simultaneously uses the current data value M to identify a memory location T in the twist memory 14 at which to store the current sequential address N. The writing of the current sequential address N into the twist memory 14 will over-write the previous address N(O) of the earlier duplicate data value N stored at the same memory location T in the twist memory 16. Since the memory locations L, LL of the log and linked list memories 12, 16 are sequentially identified by sequential address values N, their stored values (data values in the log memory 12 and previous address values in the linked list memory 16) will never be over-written.

Figure 12:
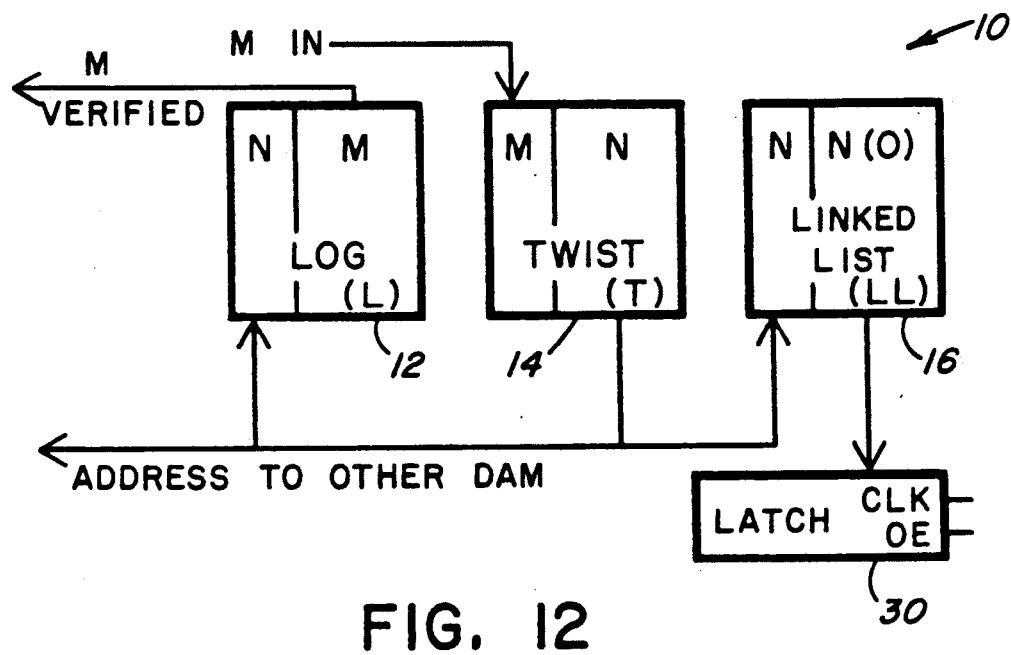
FIG. 12 is a diagram of the DAM architecture, using the standard symbology to illustrate a first step of a two-step memory read operation.
Figure 13:
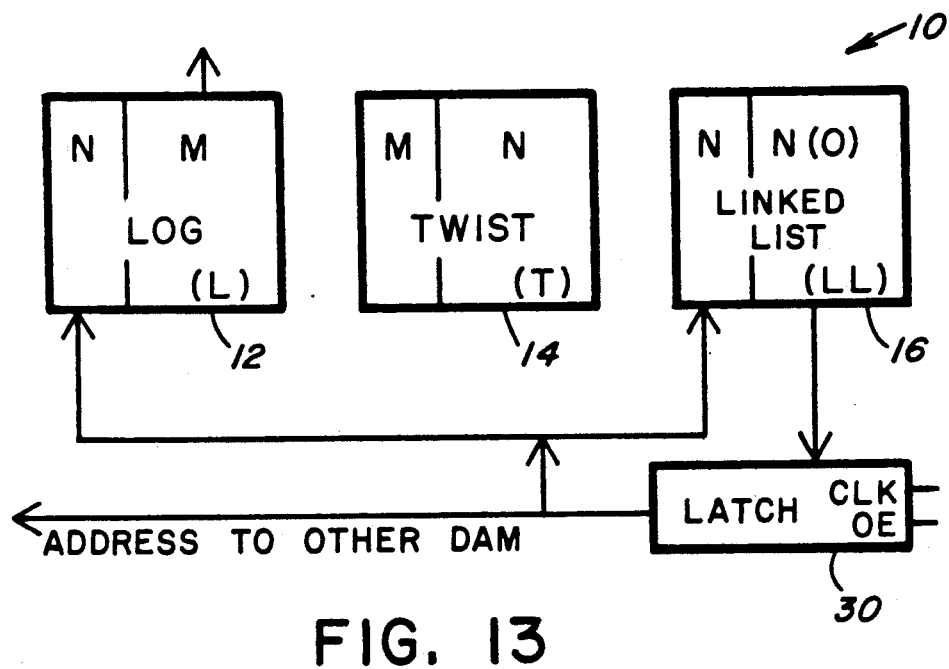
FIG. 13 is a diagram of the DAM architecture, using the standard symbology to illustrate a second step of the two-step memory read operation.
Figure 14:
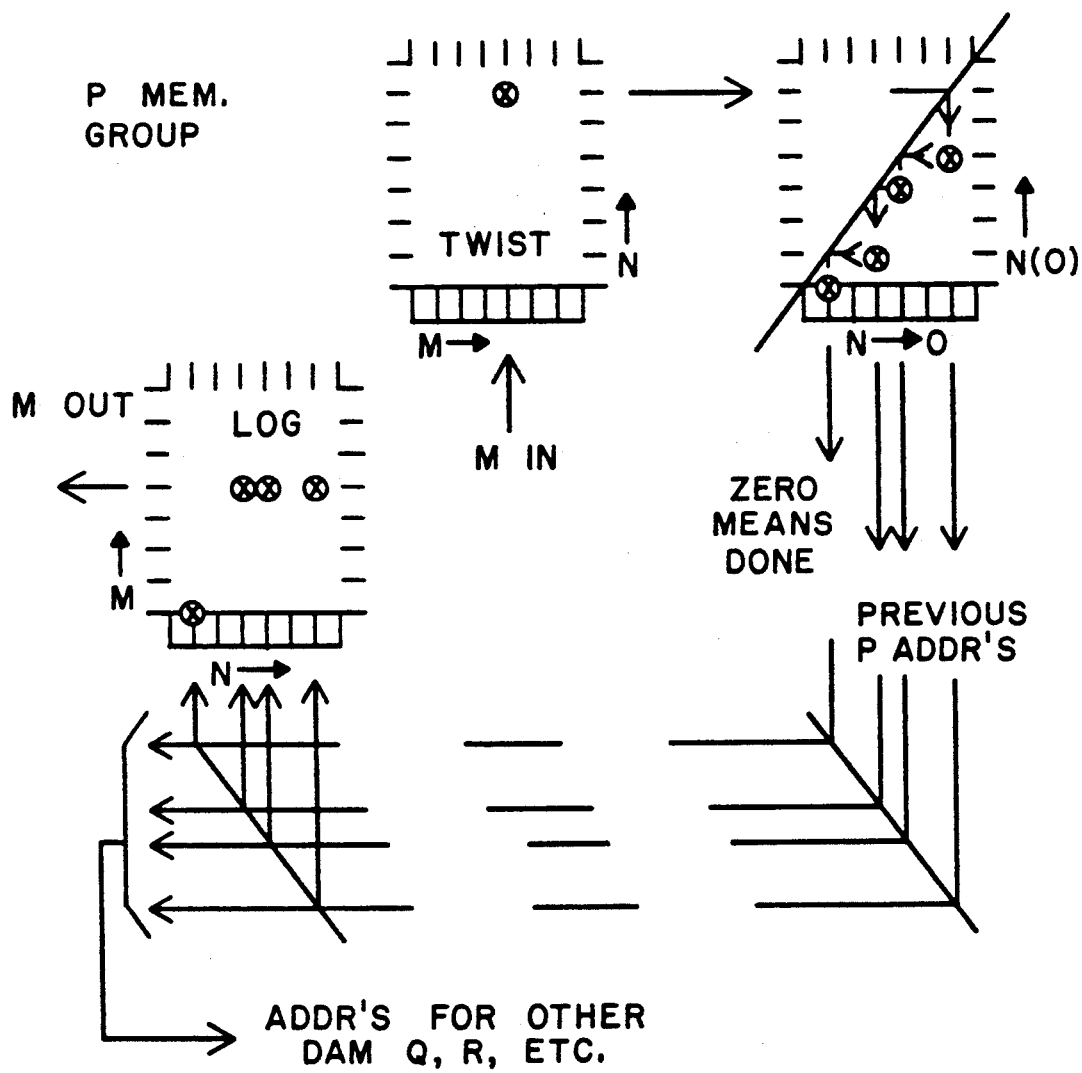
FIG. 14 is a diagram of the DAM architecture, using the X-Y coordinate symbology to illustrate the steps of the memory read operation cycling through a sequence of over-written address values stored in the linked list memory to read out the over-written address values from the linked list memory in order to read out the identical data values from the log memory.
Figure 15:
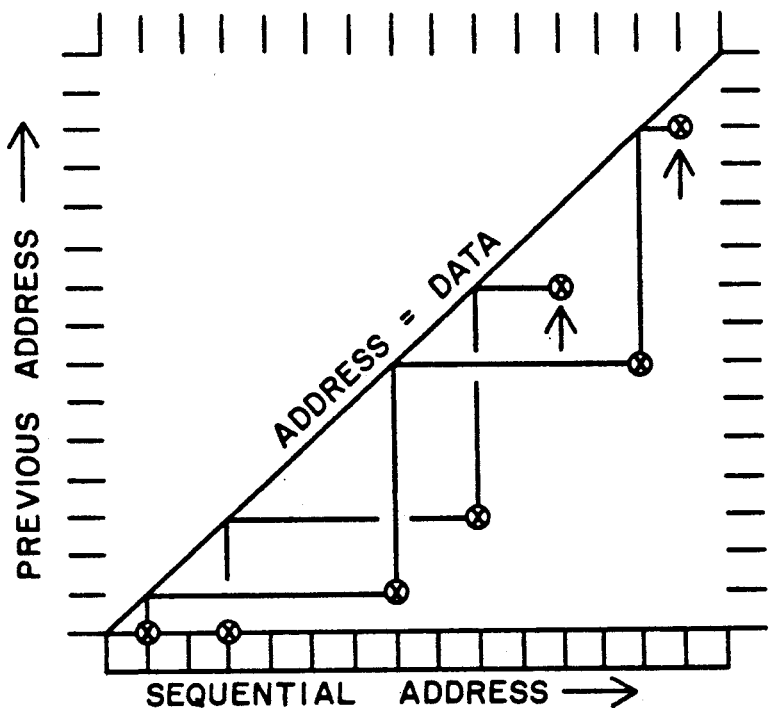
FIG. 15 is a diagram of the DAM architecture, using the X-Y coordinate symbology to illustrate two different sequences of over-written address values stored in the linked list memory.

FIGS. 12 and 13 diagrammatically illustrate, in standard symbology, the first and second steps of a two-step memory read operation employing the DAM architecture 10 of the present invention. FIG. 14 graphically illustrates, in X-Y coordinate symbology, the first and second steps of the same two-step memory read operation.

The first memory read step employing the DAM architecture 10, being shown in FIGS. 12 and 14, uses a current data value M to query the twist memory 14 (see M IN arrow) via its address port in order to read out from the twist memory 14 the address value N of the most recent duplicate of the data value M, if one exists in the twist memory 14. The address value N read out from the twist memory 14 is used at the log memory 12 to identify directly the memory location L storing the most recent duplicate of the data value M in the log memory 12 and is also used to recover the most recent over-written address value N(O), if one exists, being stored in the linked list memory 16 of the next most recent duplicate data value M, if one exists, being stored in the log memory 12. The recovered most recent over-written address value N(O) is read from the linked list memory 16 and stored in the latch 30 (FIG. 20) of the control means 18.

The second memory read step employing the DAM architecture 10, being shown in FIGS. 13 and 14, uses the most recent over-written address value N(O) recovered from the linked list memory 16 and stored in the latch 30 to identify the memory location L of the log memory 12 where another duplicate data value M is stored and to read out such duplicate data value from the log memory 12. The most recent over-written address value N(O) recovered from the linked list memory 16 and stored in the latch 30 is also used to query the linked list memory 16 to recover the next most recent over-written address value N(O), if one should exist. The next most recent over-written address value N(O), if one is recovered, is read out and stored in the latch 30 and then on the next cycle is used to directly identify and read out another duplicate data value M stored in the log memory 12. These read steps are repeated until the given sequence of over-written address values N(O) stored in the linked list memory 16 are read out and used to identify and read out all of the duplicate data values M from the log memory 12. Completion of the sequence of over-written address values N(O) stored in the linked list memory 16 by the reading of a zero value into the latch 30.

It should also be pointed out here that each data value M read from the log memory 12 is verified against the original queried data value M which is retained in the other latch 32 (FIGS. 20 and 23) until all duplicate data values M have been recovered. Also, the sequence of over-written address values N(O) read from the linked list memory 16 are used not only to identify or address the one log memory 12 for the P data member group illustrated in FIGS. 12-14, but also to address the log memories of other Q, R, etc., data member groups. Also, FIG. 15, using the X-Y coordinate symbology, merely illustrates at least two different sequences of over-written address values can be stored in the linked list memory 16 of the DAM architecture 10.

Figure 16:
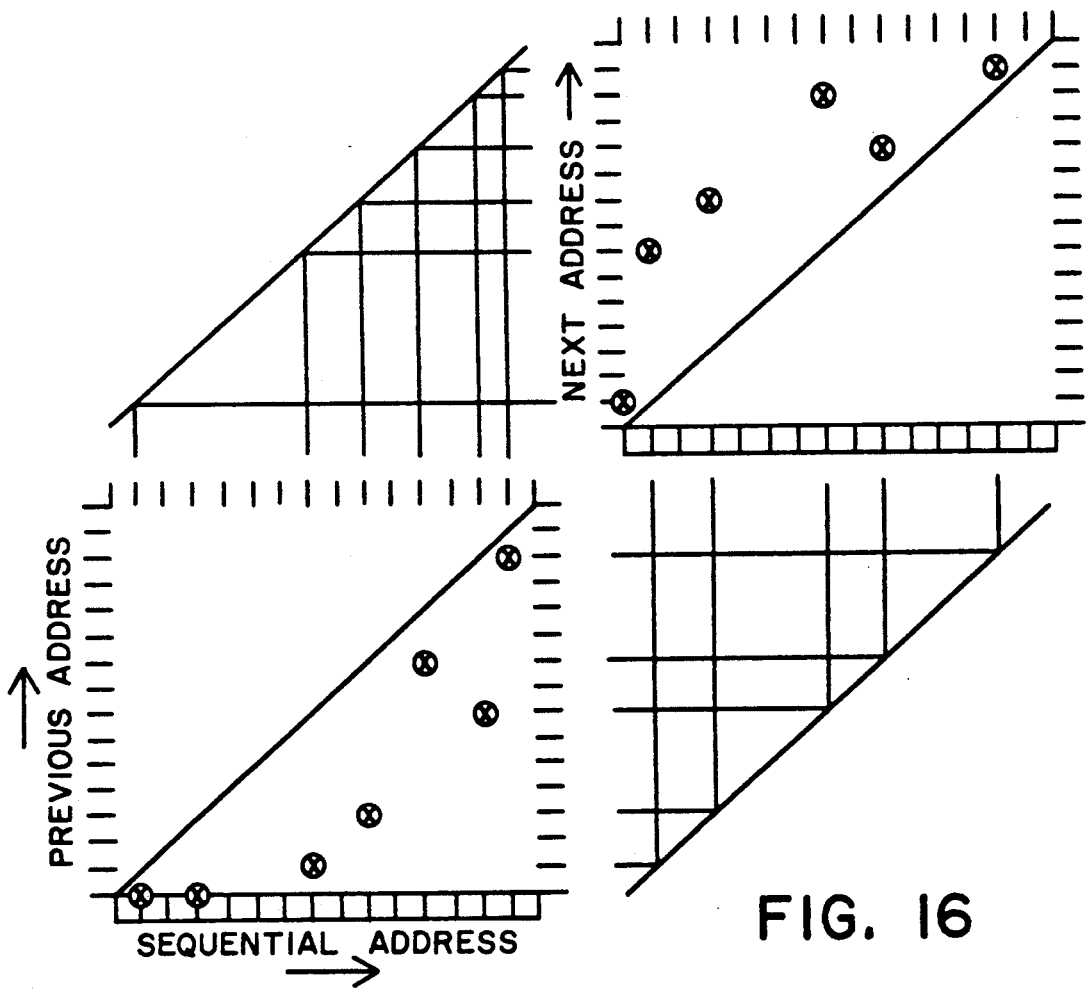
FIG. 16 is a diagram of the DAM architecture, using the X-Y coordinate symbology to illustrate a forward linked list memory compared to the reverse linked list memory being illustrated earlier.
Figure 17:
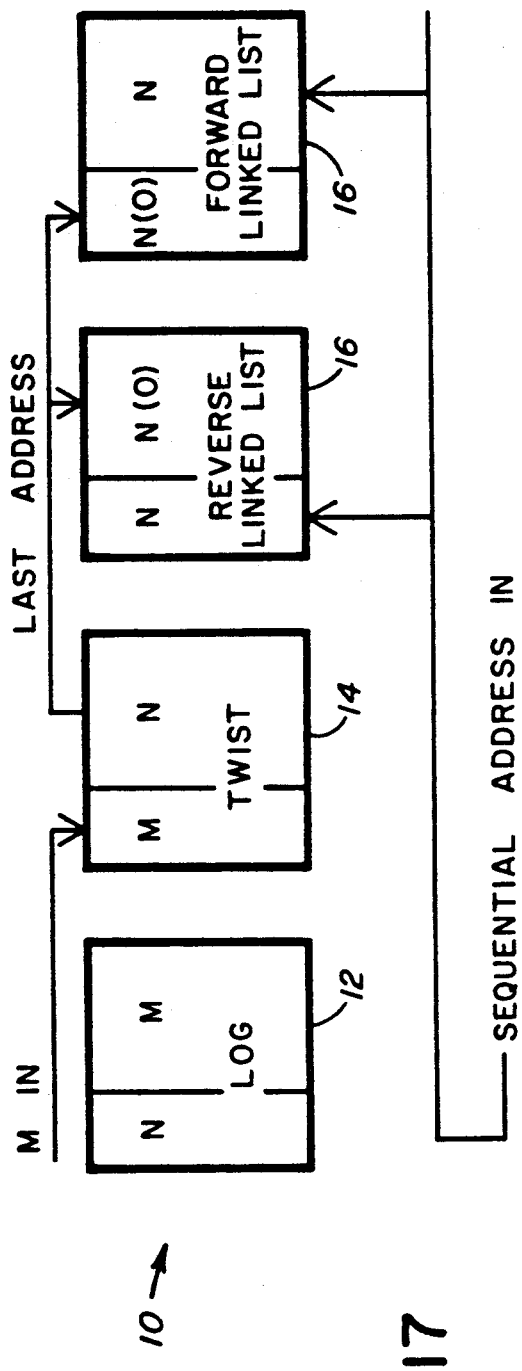
FIG. 17 is a diagram of the DAM architecture, using the standard symbology to illustrate a memory write operation in conjunction with both forward and reverse linked list memories.
Figure 18:
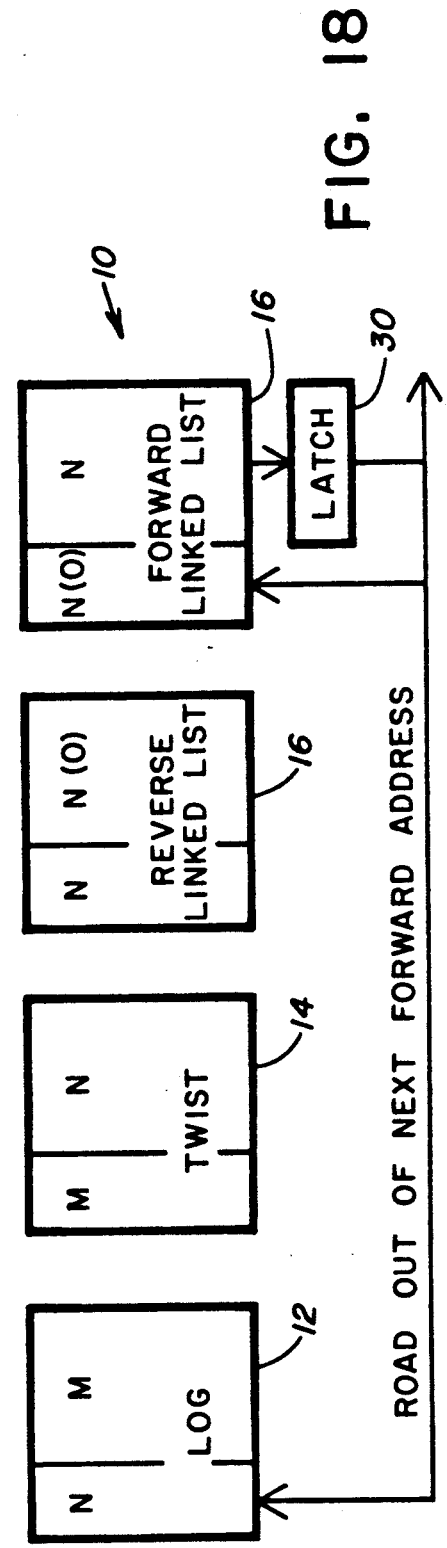
FIG. 18 is a diagram of the DAM architecture, using the standard symbology to illustrate a memory read operation in conjunction with both forward and reverse linked list memories.
Figure 19:
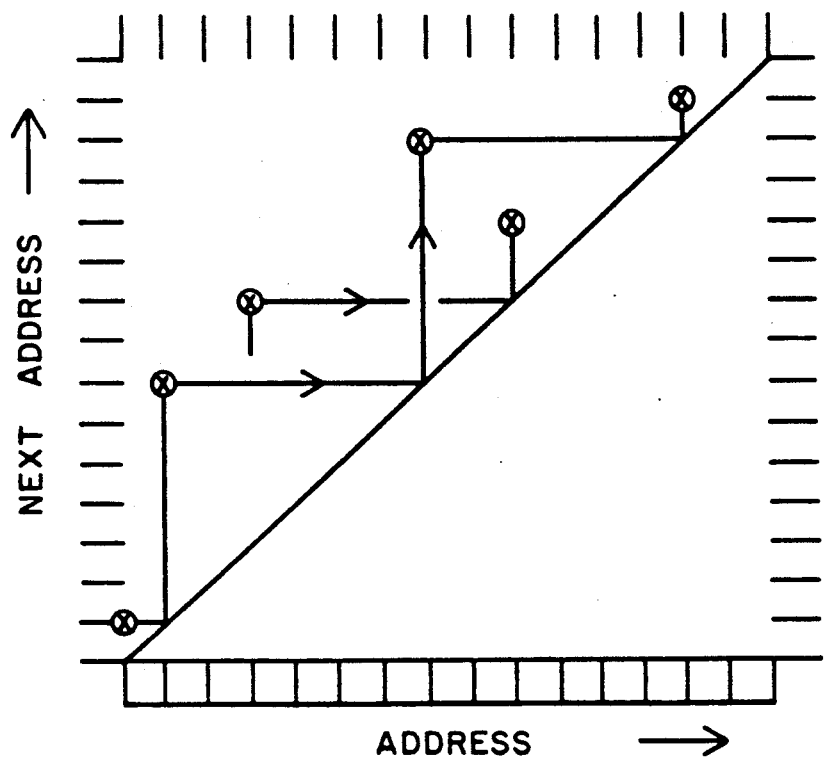
FIG. 19 is a diagram of the DAM architecture, using the X-Y coordinate symbology to illustrate a sequence of over-written address values stored in the forward linked list memory.

In the DAM architecture 10 of FIGS. 7-15, the linked list memory 16 is in a "reverse" linked list configuration, meaning that the over-written address values N(O) are read out of the linked list memory 16 in the reverse of the order in which they were stored or written into the linked list memory 16. FIGS. 16-19 depict employing another linked list memory 16A which can be characterized as being in a "forward" linked list configuration. This means that the over-written address values N(O) are read out of the linked list memory 16A in the same order as they were stored or written into the linked list memory 16A. FIG. 16, using the X-Y coordinate symbology, illustrates the forward linked list memory 16A compared to the reverse linked list memory 16. FIG. 17, using standard symbology similar to FIG. 9, illustrates the first step of the memory write operation performed in conjunction with both forward and reverse linked list memories 16, 16A. FIG. 18, using standard symbology similar to FIG. 13, illustrates the second step of the memory read operation performed in conjunction with forward linked list memory 16A. The sequence performed is the same until a zero output is indicated. FIG. 19 is similar to FIG. 15 except that uses the X-Y coordinate symbology to illustrate at least two different sequence of over-written address values stored in the forward linked list memory 16A.

The DAM architecture 10 of the present invention can be implemented in either software or hardware. An illustrative embodiment of a hardware implementation of the DAM architecture now follows.

DAM Architecture Hardware Implementation

Referring to FIG. 20, there is illustrated, in a detailed block diagram, a representative example of a hardware implementation employing a single unit of the DAM architecture 10, such as for one member P of a data set, which has the makeup and operation as described above. FIG. 21 is a chart setting forth the functions occurring at the various control, address and data ports C, A, D of each of the log, twist and linked list memories 12, 14, 16 of the DAM architecture 10.

Figure 22:
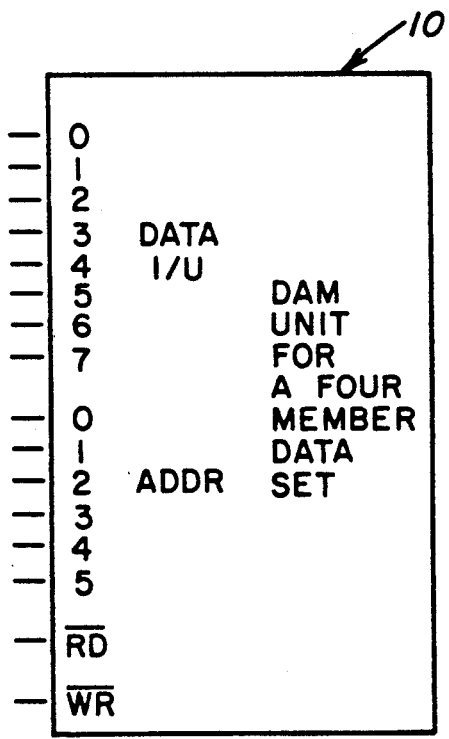
FIG. 22 is a general block diagram of a hardware unit of the DAM architecture for four members of a data set.
Figure 23:
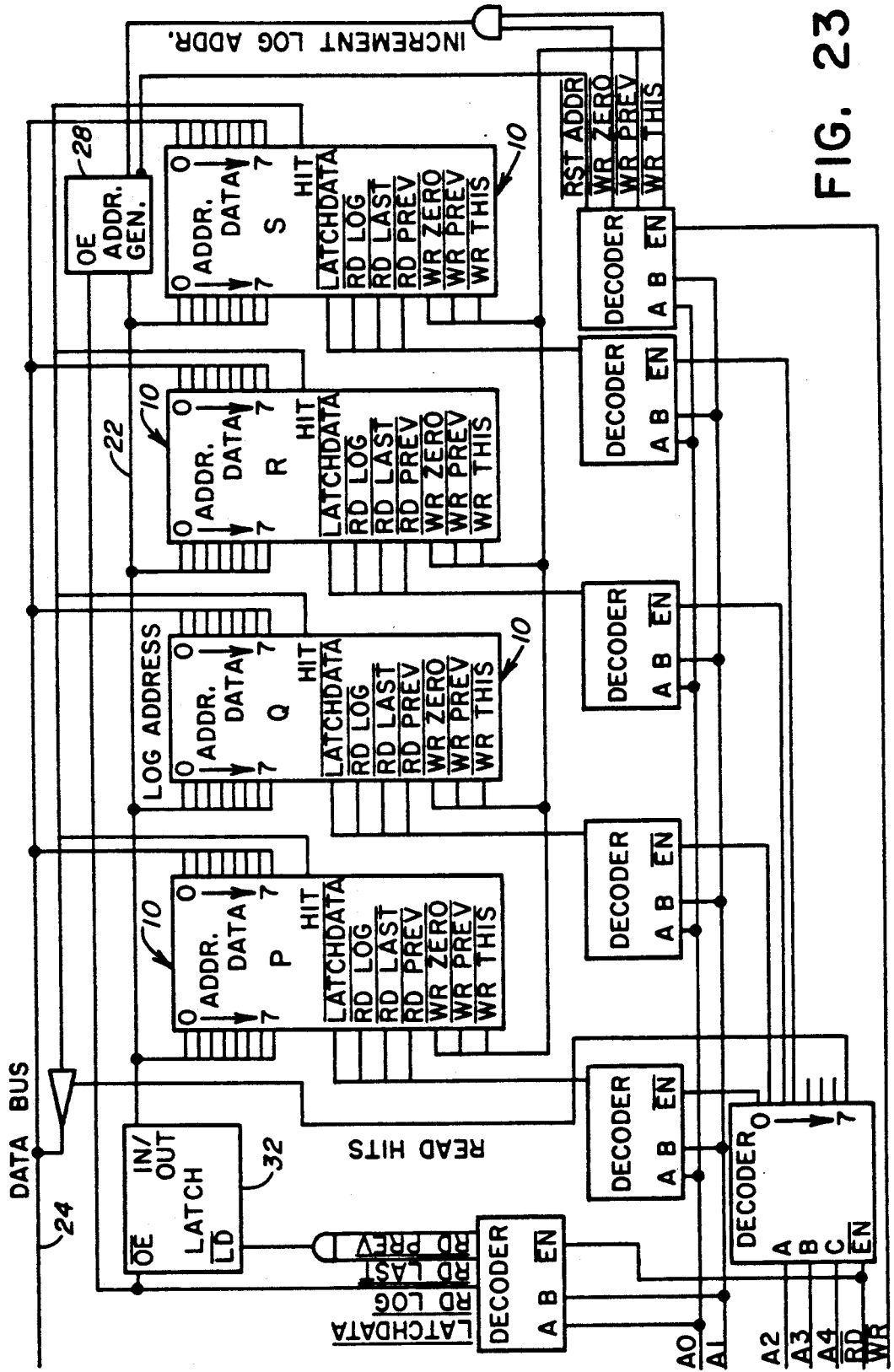
FIG. 23 is a detailed block diagram of the hardware unit of the DAM architecture of FIG. 22.

FIGS. 22 and 23 are general and detailed block diagrams, respectively, of representative examples of a hardware unit incorporating four of the single units of the DAM architecture 10 of FIG. 20 for use with four members P, Q, R and S of a data set. The individual log, twist and linked list memories 12, 14, 16 of the DAM architecture 10 of FIGS. 20 and 22 are preferably, but not necessarily, conventional write/read RAMs. The log, twist and linked list memories 12, 14, 16 of the DAM architecture 10 are uniquely connected and coupled in accordance with the present invention with control means 18. As mentioned earlier, the control means 18 is formed by an arrangement of the individually-conventional address generator 28, latches 30, 32, digital logic (such as tri-state) gates 32, multiplexers 34 and decoders 36 that variously connect the log, twist and linked list memories 12, 14, 16 as seen in FIG. 20 and 23 of the respective hardware units memories in parallel with one another and in desired connective configurations with the control, address and data buses. 20, 22, 24. In other words, no special devices are required to implement the DAM architecture 10, nor are there any size limitations to it. In view of the previous detailed description of the makeup and operation of the MAP architecture provided earlier with reference to FIGS. 1-19, it is believed that one of ordinary skill in the art will be able to understand the manner of operation of the respective hardware units shown in FIGS. 20 and 23 as guided by the subject matter set forth in the chart of FIG. 21 without the need for any further description with respect thereto.

TABLE I below is a listing of the machine level instructions for programming purposes which correspond to the pin designations set forth in the general block diagram of the multiple hardware unit in FIG. 22 and which correspond to the functions of the DAM architecture 10 set forth in FIGS. 20 and 21.

TABLE I

| RD/WR | ADDR | FUNCTION | SET |
|---|---|---|---|
| RD | 0 | Latch Data | P |
| RD | 1 | Read Log | P |
| RD | 2 | Read Last | P |
| RD | 3 | Read Prev | P |
| RD | 4 | Latch Data | Q |
| RD | 5 | Read Log | Q |
| RD | 6 | Read Last | Q |
| RD | 7 | Read Prev | Q |
| RD | 8 | Latch Data | R |
| RD | 9 | Read Log | R |
| RD | A | Read Last | R |
| RD | B | Read Prev | R |
| RD | C | Latch Date | S |
| RD | D | Read Log | S |
| RD | E | Read Last | S |
| RD | F | Read Prev | S |
| RD | 1C | Read Hits | |
| WR | 0 | Reset address generator | |
| WR | 1 | Write zero (zero should be in data latches also) | |
| WR | 2 | Write prev addr to linked list | |
| WR | 3 | Write this data to log and twist | |

TABLE II below sets forth outlines of four procedures for using the DAM architecture 10. The four procedures are ZERO OUT, WRITE A DATA SET, QUERY USING Q and QUERY SPECIFYING P, Q, S.

TABLE II

ZERO OUT
  Reset address generator to zero
  Put zero in data bus
  Latch data in P, Q, R and S
  From zero to highest address
    Write Zero
  Next
  Set address generator back to zero
WRITE A DATA SET
  Put P value on data bus
  Latch data P
    (Repeat above for Q, R and S)
  Write Previous
  Write this
QUERY USING Q
  Put Q on data bus
  Latch data Q
  Read last Q
  Read Log P, Log R and Log S
  DO UNTIL Q reads out zero
    Read prev Q
    Read Log P, Log R and Log S
  Next
QUERY SPECIFYING P, Q, S
  Put P on data bus
  Latch data P
    (repeat for Q and S)
  Read Last S
    (Note that from here down P or Q could be used instead)
  Read Hits
  If hit(P)=1 and hit(Q)=1 and hit(S)=1 then
    Read Log P, Log Q and Log R
    Print P, Q, R, S
  DO UNTIL S=0
    Read prev S
    Read Hits
    If hit(P)=1 and hit(Q)=1 and hit(S)=1 then
      Read Log P, Log Q and Log R
      Print P, Q, R, S
  Else Next.

In summary, the DAM architecture 10 results from a unique twist connection between two common memory devices. The address of the log memory is the data for the twist memory while the data for the log memory is then an address for the twist memory. The linked list memory, addressed identically to the log memory, gives access to information over-written in the twist memory. The DAM architecture has the following advantages: (1) no size limitations; (2) uses readily available memory devices; (3) allows duplications of data; (4) recovers any entry without searching; (5) has an inherent audit trail; (6) can have both a forward and a reverse linked list; and (7) recovers all entries without ambiguity. It should also be understood that each of the memory devices 12, 14, 16 used in the DAM architecture 10 can be any of a wide variety of write/read memory devices, such as a conventional read only memory (ROM), random access memory (RAM), magnetic tape, core memory, etc.

It is thought that the present invention and its advantages will be understood from the foregoing description and it will be apparent that various changes may be made thereto without departing from its spirit and scope of the invention or sacrificing all of its material advantages, the form hereinbefore described being merely preferred or exemplary embodiment thereof.

Having thus described the invention, what is claimed is:

1. A data addressable memory architecture, comprising:
(a) a first memory defining a plurality of first memory locations capable of being sequentially identified by different address values and of storing data values at least some of which can be identical;
(b) a second memory defining a plurality of second memory locations capable of being sequentially identified by said data values and of storing said address values such that said second memory permits a subsequent one of said address values to over-write a previous one of said address values stored at the same one of said second memory locations identified by identical ones of said data values; and
(c) a third memory defining a plurality of third memory locations capable of being sequentially identified by said address values and of storing said overwritten address values such that said address values over-written at said second memory locations of said second memory, which identify first memory locations of said first memory where identical ones of said data values are stored, are preserved at said third memory locations of said third memory.

2. The architecture of claim 1 further comprising:
(d) control means coupling said first, second and third memories in predetermined configurations with separate control, address and data buses for enabling and controlling identifying, writing and reading of said memory locations of said first, second and third memories by said address and data values.

3. The architecture of claim 2 wherein said control means is an arrangement of digital logic gates, multiplexers, latches and an address generator that connect said first, second and third memories in parallel with one another and in said predetermined configurations with said control, address and data buses.

4. The architecture of claim 1 wherein each of said first, second and third memories is a memory device having control ports, address ports, data ports, and an array of said memory locations, each memory location capable of being enabled via said control ports, identified via said address ports and written into and read from via said data ports.

5. The architecture of claim 4 wherein each of said memory devices is a random access memory device.

6. The architecture of claim 4 further comprising:
(d) control means coupling said first, second and third memories in predetermined configurations with separate control, address and data buses for enabling and controlling identifying, writing and reading of said memory locations of said first, second and third memories by said address and data values.

7. The architecture of claim 6 wherein said control means is an arrangement of digital logic gates, multiplexers, latches and an address generator that connect said first, second and third memories in parallel with one another and in said predetermined configurations with said control, address and data buses.

8. The architecture of claim 6 wherein said control means is operable to enable and control the sequential identifying of said first memory locations by generating and transferring said address values via the address bus to said address ports of said first memory and operable to enable and control writing of said data values from the data bus into said first memory locations of said first memory via said data ports thereof and reading of said data values from said first memory locations of said first memory via the data ports thereof to the data bus, as said first memory locations of said first memory are being sequentially identified using said address values via said address ports of said first memory.

9. The architecture of claim 8 wherein said control means is operable to enable and control the sequential identifying of said second memory locations by transferring said data values from the data bus to said address ports of said second memory and operable to enable and control writing of said address values from the address bus into said second memory locations, of said second memory via said data ports thereof and reading of said address values from said second memory locations of said second memory via said data ports thereof to the address bus, as said second memory locations of said second memory are being sequentially identified using said data values via said address ports of said second memory, such that the writing of said address values from the address bus to said second memory locations of said second memory via said data ports thereof causes a subsequent address value to over-write a previous address value stored at a same one of said second memory locations identified by identical ones of said data values.

10. The architecture of claim 9 wherein said control means is operable to enable and control the identifying of said third memory locations by transferring said address values from said data ports of said second memory to said data ports of said third memory and operable to enable and control writing of the over-written address values from said data ports of said second memory to said third memory locations of said third memory via said data ports thereof and reading of the over-written address values from said third memory locations of said third memory via the data ports thereof to the address bus, as said third memory locations are being sequentially identified using said address values via said address ports of said third memory, such that the writing of the over-written address values from said data ports of said second memory to said third memory via said data ports thereof will preserve the over-written address values in said third memory and the reading of the over-written address values from said third memory via said data ports thereof to the address bus and followed by subsequent sequential transfer of such over-written address values to said address ports of said first memory for identifying ones of said first memory locations therewith permits sequential retrieving at said data ports of said first memory of all identical ones of said data values from said identified first memory locations of said first memory.

11. A data addressable memory architecture, comprising:
(a) separate bi-directional control, address and data buses;
(b) a set of log, twist and linked list memories, each of said memories having a set of control ports, address ports and data ports, said log, twist and linked list memories having respective arrays of log, twist and linked list memory locations, each memory location capable of being enabled and controlled via said control ports, identified via said address ports and written into and read from via said data ports; and
(c) control means connecting said set of control, address and data ports of each of said log, twist and linked list memories in different configurations with said separate bi-directional control, address and data buses for enabling and controlling identifying, writing and reading operations with respect to said log, twist and linked list memories;
(d) a first of said connecting configurations of said control means making said log memory locations capable of being sequentially identified by different address values and of storing data values at least some of which can be identical;
(e) a second of said connecting configurations of said control means making said twist memory locations capable of being sequentially identified by said data values and of storing said address values such that a subsequent one of said address values is permitted to over-write a previous one of said address values stored at the same one of said second memory locations identified by identical ones of said data values;
(f) a third of said connecting configurations of said control means making said linked list memory locations capable of being sequentially identified by said address values and of storing said over-written address values such that said address values over-written at said twist memory locations, which identify log memory locations of said log memory where identical ones of said data values are stored, are preserved at said linked list memory locations.

12. The architecture of claim 11 wherein said control means is operable to enable and control the sequential identifying of said log memory locations by generating and transferring said address values via the address bus to said address ports of said log memory and operable to enable and control writing of said data values from the data bus into said log memory locations of said log memory via said data ports thereof and reading of said data values from said log memory locations of said log memory via the data ports thereof to the data bus, as said log memory locations of said log memory are being sequentially identified using said address values via said address ports of said log memory.

13. The architecture of claim 12 wherein said control means is operable to enable and control the sequential identifying of said twist memory locations by transferring said data values from the data bus to said address ports of said twist memory and operable to enable and control writing of said address values from the address bus into said twist memory locations of said twist memory via said data ports thereof and reading of said address values from said twist memory locations of said twist memory via said data ports thereof to the address bus, as said twist memory locations of said twist memory are being sequentially identified using said data values via said address ports of said twist memory, such that the writing of said address values from the address bus to said twist memory locations of said twist memory via said data ports thereof causes a subsequent address value to over-write a previous address value stored at a same one of said twist memory locations identified by identical ones of said data values.

14. The architecture of claim 13 wherein said control means is operable to enable and control the identifying of said linked list memory locations by transferring said address values from said data ports of said twist memory to said data ports of said linked list memory and operable to enable and control writing of the over-written address values from said data ports of said twist memory to said linked list memory locations of said linked list memory via said data ports thereof and reading of the over-written address values from said linked list memory locations of said linked list memory via the data ports thereof to the address bus, as said linked list memory locations are being sequentially identified using said address values via said address ports of said linked list memory, such that the writing of the over-written address values from said data ports of said twist memory to said linked list memory via said data ports thereof will preserve the over-written address values in said linked list memory and the reading of the over-written address values from said linked list memory via said data ports thereof to the address bus and followed by subsequent sequential transfer of such over-written address values to said address ports of said log memory for identifying ones of said log memory locations therewith permits sequential retrieving at said data ports of said log memory of all identical ones of said data values from said identified log memory locations of said log memory.

15. A method of forming a data addressable memory architecture, comprising the steps of:
(a) defining a plurality of first memory locations capable of being sequentially identified by different address values and of storing data values at least some of which can be identical;
(b) defining a plurality of second memory locations capable of being sequentially identified by said data values and of storing said address values such that a subsequent one of said address values is permitted to over-write a previous one of said address values stored at the same one of said second memory locations identified by identical ones of said data values; and
(c) defining a plurality of third memory locations capable of being sequentially identified by said address values and of storing said over-written address values such that said address values over-written at said second memory locations, which identify said first memory locations where identical ones of said data values are stored, are preserved at said third memory locations.

16. The method of claim 15 further comprising the step of:
defining control ports capable of enabling said memory locations and of controlling writing into and reading from said memory locations.

17. The method of claim 16 further comprising the steps of:
defining address ports capable of being enabled and controlled to identify said memory locations; and
defining data ports capable of being enabled and controlled to write into and read from said memory locations.

18. The method of claim 17 further comprising the steps of:
enabling and controlling sequential identifying of said first memory locations by generating and transferring said address values via a address bus to said address ports of said first memory locations;
enabling and controlling writing of said data values from a data bus into said first memory locations via said data ports thereof and reading of said data values from said first memory locations via said data ports thereof to the data bus, as said first memory locations are being sequentially identified using said address values via said address ports of said first memory locations.

19. The method of claim 18 further comprising the steps of:
enabling and controlling sequential identifying of said second memory locations by transferring said data values from the data bus to said address ports of said second memory locations; and
enabling and controlling writing of said address values from the address bus into said second memory locations via said data ports thereof and reading of said address values from said second memory locations via said data ports thereof to the address bus, as said second memory locations are being sequentially identified using said data values via said address ports of said second memory locations, such that writing of said address values from the address bus to said second memory locations via said data ports thereof causes a subsequent address value to over-write a previous address value stored at a same one of said second memory locations identified by identical ones of said data values.

20. The method of claim 19 further comprising the steps of:
enabling and controlling identifying of said third memory locations by transferring said address values from said data ports of said second memory locations to said data ports of said third memory locations; and enabling and controlling writing of the over-written address values from said data ports of said second memory locations to said third memory locations via said data ports thereof and reading of the over-written address values from said third memory locations via the data ports thereof to the address bus, as said third memory locations are being sequentially identified using said address values via said address ports of said third memory locations, such that writing of the over-written address values from said data ports of said second memory locations to said third memory locations via said data ports thereof will preserve the over-written address values in said third memory locations and reading of the over-written address values from said third memory locations via said data ports thereof to the address bus and followed by subsequent sequential transfer of such over-written address values to said address ports of said first memory locations for identifying ones of said first memory locations therewith permits sequential retrieving at said data ports of said first memory locations of all identical ones of said data values from said identified first memory locations.

* * * * *